United States Patent
Weber

(10) Patent No.: US 8,026,839 B2
(45) Date of Patent: *Sep. 27, 2011

(54) SELECTIVE-SAMPLING RECEIVER

(76) Inventor: Daniel Alexander Weber, Cedar City, UT (US)

( * ) Notice: Subject to any disclaimer, the term of this patent is extended or adjusted under 35 U.S.C. 154(b) by 957 days.

This patent is subject to a terminal disclaimer.

(21) Appl. No.: 11/938,697

(22) Filed: Nov. 12, 2007

(65) Prior Publication Data

US 2010/0283664 A1 Nov. 11, 2010

Related U.S. Application Data

(63) Continuation-in-part of application No. 11/186,712, filed on Jul. 21, 2005, now Pat. No. 7,295,145.

(60) Provisional application No. 60/590,095, filed on Jul. 21, 2004.

(51) Int. Cl.
*G01S 7/36* (2006.01)
*G01S 13/38* (2006.01)

(52) U.S. Cl. ............ 342/16; 342/17; 342/159; 342/162

(58) Field of Classification Search .............. 342/16–19, 342/159–162, 175, 192, 194–196
See application file for complete search history.

(56) References Cited

U.S. PATENT DOCUMENTS

| | | | |
|---|---|---|---|
| 4,584,710 A | 4/1986 | Hansen | |
| 4,972,430 A | 11/1990 | Cantwell | |
| 6,901,105 B1 | 5/2005 | Razzell | |
| 7,295,145 B2 * | 11/2007 | Weber | 342/16 |
| 7,660,341 B2 * | 2/2010 | Durand et al. | 375/147 |
| 7,969,344 B1 * | 6/2011 | Mahafza | 342/13 |
| 2001/0050948 A1 | 12/2001 | Ramberg et al. | |
| 2002/0064245 A1 | 5/2002 | McCorkle | |
| 2003/0112905 A1 | 6/2003 | Heinzl et al. | |
| 2004/0053596 A1 | 3/2004 | Svensson et al. | |
| 2006/0176988 A1 | 8/2006 | Sohn et al. | |
| 2006/0212910 A1 | 9/2006 | Endres et al. | |
| 2007/0086547 A1 | 4/2007 | Sobchak et al. | |
| 2007/0096976 A1 | 5/2007 | Loehner et al. | |

FOREIGN PATENT DOCUMENTS

WO WO 2006078314 7/2006

OTHER PUBLICATIONS

Applebaum, Sidney P., "Adaptive Arrays with Main Beam Constraints", IEEE Transactions on Antennas and Propagation, vol. AP-24, No. 5, Sep. 1976.

(Continued)

*Primary Examiner* — John Sotomayor
(74) *Attorney, Agent, or Firm* — Workman Nydegger

(57) ABSTRACT

A receiver that selectively samples a received signal in order to suppress an interference component of the signal while recovering a desired component. The selective sampling may be accomplished by low cost, low complex analog or digital circuitry. The receiver includes a first input that receives a first signal, including a desired signal component and an interference signal component and a second input that receives a second signal including the interference component only. The first and second signals are then provided to the sampling circuitry. First, the phase of the interference component of the both the first and second signals is aligned. Next, the points in a wave cycle that the second signal is at a power minimum are detected. Finally, first signal is sampled close to the point when the second signal is at the power minimum to recover the desired signal component and suppress the interference component.

20 Claims, 12 Drawing Sheets

OTHER PUBLICATIONS

Godara, Lal Chand, "Smart Antennas", Book, pp. 1-443, 2004 CRC Press LLC, Boca Raton, Florida.

Griffiths, Lloyd J. "An Alternative Approach to Linearly Constrained Adaptive Beamforming", IEEE Transactions on Antennas and Propagation, vol. AP-30, No. 1, Jan. 1982.

Matthaei, G., Young, L., and Jones, E.M.T. "Microwave Filters, Impedance-Matching Networks, and Coupling Structures", Book, pp. 434-440, 1980 Norwood, MA: Artech House.

Thomas, Timothy A., Vook, Frederick W., "Suppression of Strong Interference in Broadband Communications via Filter Banks", IPCOM000141444D, Sep. 23, 2004, Allerton 2004, Motorola, Inc.

* cited by examiner (Figure 7)

SELECTIVE-SAMPLING RECEIVER

CROSS-REFERENCE TO RELATED APPLICATIONS

This application is a Continuation-in-Part of U.S. patent application Ser. No. 11/186,712, entitled SELECTIVE-SAMPLING RECEIVER and filed Jul. 21, 2005, which application claims the benefit of U.S. Provisional Patent Application Ser. No. 60/590,095, filed Jul. 22, 2004. The foregoing applications are incorporated herein in their entirety by this reference.

BACKGROUND OF THE INVENTION

1. The Field of the Invention

The present invention relates generally to receiver systems and methods for interference suppression. More specifically, the present invention relates to a selective-sampling receiver and methods able to mitigate the interference in received signals.

2. The Relevant Technology

Transmitting and receiving radio frequency (RF) signals over the airwaves is a vital part of the world today, having wide use in military and commercial applications. For example, radar systems at an airport send and receive signals that are used to track airplanes taking off and landing. Radar signals are also used to track the movement of armed forces on a battlefield or are used to track incoming enemy missiles or planes. In like manner, cellular phones use an antenna to send and receive voice communication signals.

All systems that receive RF signals, from the hand held cellular phone to the most complex radar system, include a receiver. The receiver is used to process signals received from an antenna. For example, the receiver may down convert the frequency of the received signals or may amplify the received signals. The receiver may also be used to sample portions of the signals. Once the receiver has finished processing the received signals, the receiver will generally send the signals to other equipment and systems such as a signal processor for further processing.

However, the signals that are provided to the receiver often are distorted by various amounts of signal interference. This interference may be from natural causes such as rain or other environmental effects. The interference may also come from other RF signals that have not been properly isolated from the desired signal. The interference may even be purposefully added, such as an interference signal from a radar jamming device used in a military application. Interference can prevent a receiver from receiving and interpreting desired signals. As a result, the interference must be dealt with by the receiver or the signal provided to the signal processor will be distorted.

In the past, many techniques have been used to suppress signal interference in the receiver. Perhaps the most common is the use of a generalized side lobe canceller. The generalized side lobe canceller uses low-gain antennas to isolate the interference signals from a desired signal. Adaptively selected magnitude and phase weights are applied to the interference signals. These weights are then used to estimate the interference component of the desired signal. The estimated interference component is then subtracted out of the desired signal, thus leaving a signal free of most interference.

Another technique that is used in receiver interference suppression is the co-channel interference mitigation in the time-scale domain algorithm. This algorithm uses a wavelet transform to estimate and reconstruct the interference from a null space in the desired signal in the time-scale domain. The estimated interferer is then subtracted from the observations and the remaining signal is an approximation of the desired signals.

These techniques and others in the prior art are able to reasonably suppress signal interference. However, they are very complex and costly. For example, a large number of antenna arrays may be necessary for interference estimates. In addition, the receiver requires costly processing abilities for making the interference estimates and then subtracting them out of the desired signal. The receiver may also need complex circuitry to perform the interference suppression operation. Therefore, what would be advantageous is a low complexity receiver with the ability to suppress interference signals using low cost components.

BRIEF SUMMARY OF THE INVENTION

The forgoing problems with the prior state of the art are overcome by the principles of the present invention, which relate to a receiver with the ability to selectively-sample a received signal in order to suppress an interference signal component of the signal while recovering a desired signal component. The selective-sampling may be accomplished by low cost, low complex analog or digital circuitry. The sampling may also be accomplished by digital algorithms.

The receiver includes a first input that receives a first signal. The first signal includes a desired signal component and an interference signal component. This first signal may be the summation output of a sigma-delta ($\Sigma\Delta$) beam-forming network The receiver also includes a second input that receives a second signal. The second signal includes the interference component only. This second signal may be the difference output of a $\Sigma\Delta$ beam-forming network which has subtracted out the desired signal component.

The first and second signals are provided to sampling circuitry. The sampling circuitry, which may be analog or digital circuitry, performs a sampling operation on the signals. First, the phase of the interference component of the both the first and second signals is aligned. Next, the points in a wave cycle that the interference component of the second signal are at a power minimum are detected. Finally, the first signal is sampled as close as possible to the point when the second signal is at the power minimum as the interference component of the first signal will also be at a power minimum. With the interference component at a minimum, only the desired signal component will be sampled. In this way, the desired signal is recovered and the interference signal is suppressed.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE PREFERRED EMBODIMENTS

The principles of the present invention relate to a receiver with the ability to selectively-sample a received signal in order to suppress an interference signal component of the signal while recovering a desired signal component. The selective-sampling may be accomplished by low cost, low complex analog or digital circuitry. The sampling may also be accomplished by digital algorithms.

The receiver includes a first input that receives a first signal. The first signal includes a desired signal component and an interference signal component. This first signal may be the summation output of a sigma-delta (ΣΔ) beam-forming network The receiver also includes a second input that receives a second signal. The second signal includes the interference component only. This second signal may be the difference output of a ΣΔ beam-forming network which has totally subtracted out the desired signal component.

The first and second signals are provided to sampling circuitry. The sampling circuitry, which may be analog or digital circuitry, performs a sampling operation on the signals. First, the phase of the interference component of the both the first and second signals is aligned. Next, the points in a wave cycle that the interference component of the second signal is at a power minimum are detected. Finally, the first signal is sampled as close as possible to the point when the second signal is at the power minimum as the interference component of the first signal will also be at a power minimum. With the interference component at a minimum, only the desired signal component will be sampled. In this way, the desired signal is recovered and the interference signal is suppressed.

Figure 1A:
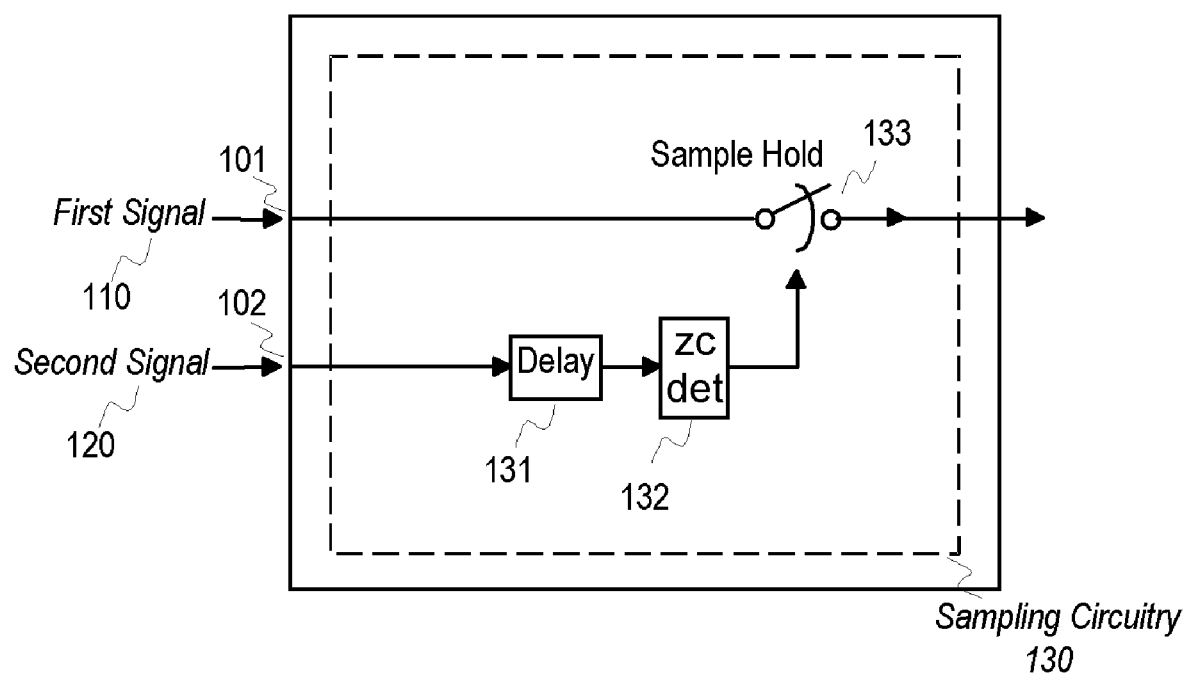
FIG. 1A schematically illustrates a ideal selective-sampling receiver in accordance with the principles of the present invention.

Referring to FIG. 1A, an exemplary selective-sampling receiver system 100 in which the principles of the present may be practiced is illustrated. Selective-sampling receiver system 100 is shown by way of illustration only and is not intended to limit the scope of the appended claims. It will become to clear to one skilled in the art from reading this specification that there are numerous ways to implement the selective-sampling receiver 100.

Selective-sampling receiver 100 includes a first receive input 101 for accessing a first signal 110. First signal 110 may be a sine wave, a square wave, a triangular wave, a pulse or any other periodic waveform at any frequency. Selective-sampling receiver 100 takes advantage of the periodic nature of the input waveform to perform a selective-sampling operation as will be described in more detail below with respect to FIG. 2.

First signal 110 is comprised of a desired signal component and an interference signal component. First signal 110 may also include other components such as thermal noise. In some embodiments, first signal 110 may be the summation output of a sigma-delta (ΣΔ) beam-forming network as will be described in further detail to follow. However, this is not required as first signal 110 may be produced by any means known in the art that combines two or more signal components into a single signal.

Selective-sampling receiver 100 also includes a second receive input 102 for accessing a second signal 120. Second signal 120 may also be a sine wave, a square wave, a triangular wave, a pulse or any other periodic waveform at any frequency. Second signal 120 is comprised of an interference signal component and may include other signal components such as thermal noise. In some embodiments, second signal 120 may be the difference output of a ΣΔ beam-forming network as will be described in further detail to follow. However, this is not required as second signal 120 may be produced by any means known to the art.

Selective-sampling receiver 100 further includes sampling circuitry 130. Sampling circuitry 130 is configured to selectively sample the first signal 110 so as to suppress the interference component of the signal and thereby recover the desired signal component. Sampling circuitry 130 may be implemented by numerous different combinations of analog or digital components. Advantageously, the selective-sampling operation may be performed by sampling circuitry 130 components that are low complexity and low cost. It should be noted that selective-sampling receiver 100 may perform the selective-sampling operation on any periodic waveform of any frequency. This includes using the selective-sampling operation in applications such as radar, sonar, and hearing aids. The selective-sampling receiver and the selective-sampling operation should not be construed to only apply to high frequency applications.

For example, sampling circuitry 130 may include delay circuitry 131 for aligning the phase of the interference component of both the first signal 110 and the second signal 120. Zero-crossing detector circuitry 132 may be used to detect the power minimums of the interference components during a wave cycle. Sample-hold circuitry 133 may be used to sample the first signal 110 at the proper time. In FIG. 1, sample-hold circuitry 133 is depicted as a switch that closes whenever zero-crossing detector 132 detects a power minimum. Sampling circuitry 130 may also include other components such as inverters, amplifiers for signal amplification, resistors, filters, and the like. As mentioned, there are numerous circuit component implementations of selective-sampling circuitry 130.

Figure 1B:
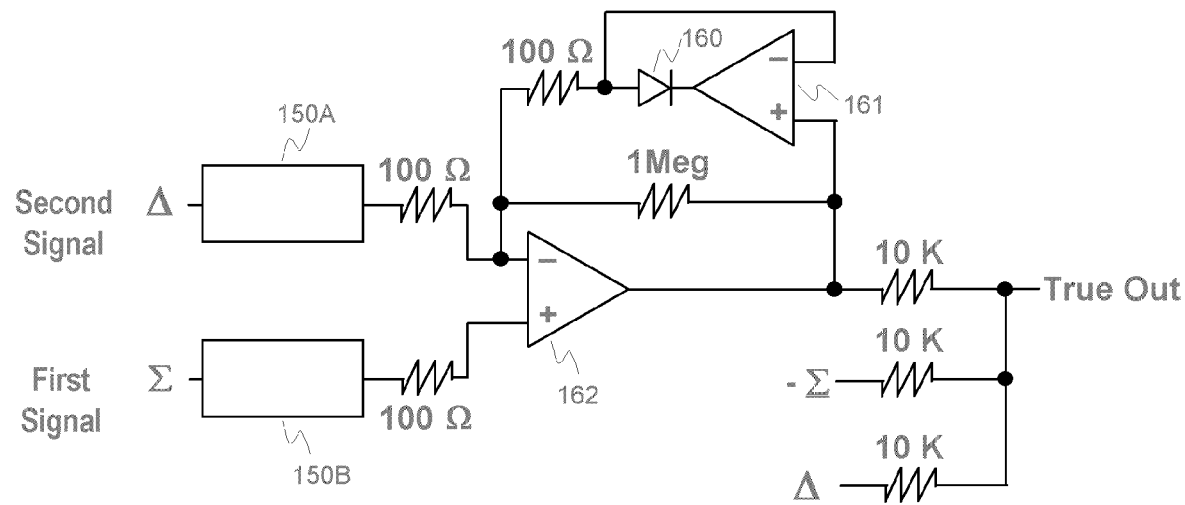
FIG. 1B schematically illustrates a specific analog embodiment of the selective-sampling receiver of FIG. 1A.

FIG. 1B illustrates a specific analog implementation of selective-sampling receiver 100. This specific implementation is by way of example only, and should not be read to limit the claims. As mentioned previously, one skilled in the art will appreciate that there are numerous different circuit implementations of selective-sampling receiver 100. As will be obvious from FIG. 1B, all of the components of the specific analog implementation of selective-sampling receiver 100 are low complexity, low cost consumer electronic components that may be easy implemented.

Specific analog implementation of selective-sampling receiver 100 includes elements 150A and 150B that may correspond to delay circuitry 131 of FIG. 1B and is used to align the phases of the interference components. Diode 160 acts as the zero-crossing detector 132 and the sample-hold circuitry 133. In this example, the diode 160 responds to absolute biasing and produces gain when the second signal is more negative than the first signal, which is the inverse of the desired relationship. As a result, the first and second signals may be rectified in some embodiments. This occurs during the negative cycle of the waveforms.

Operational-amplifier 161 is used to bias the diode to avoid non-linearity's that might otherwise be produce during sampling. When the magnitude of the first signal is greater than the magnitude of the second signal, which occurs at the power minimums of the second signal, diode 160 will not conduct and resistance in the feedback loop of operational-amplifier 162 will be high. This provides timing for the sampling that effectively blocks the interference component of the first signal and allows gain for the desired signal component from operational amplifiers. Alternatively, when the magnitude of the second signal is greater than the first signal, then diode 160 conducts and a gain of one or unity is added to the signal. Various resistors are also used in this implementation for signal control, by producing a mirror image of the unity gain signal that when added, cancels the unity gain signal out.

This circuit may be tuned, if necessary, by attenuating the first signal, thereby decreasing the amount of time that the amplitude of the first signal exceeds the amplitude of the second signal. However, as the first signal is attenuated, the circuit will suffer from decreased signal to noise ratio since noise from the second signal is imprinted on to the output of the circuit. However, the output can be used to trigger the digitalization of the first signal, allowing for reconstruction of the desired signal that is then passed on. As the first signal becomes more attenuated, the timing resolution of the selective-sampling increases.

This circuit may also be used with multipath and/or pulsed signals. The system described above will produce continuous output of a bore-site signal in the absence of any overpowering multipath or jamming signal. This means that the first part of the accessed first signal is passed since it is at bore-site. When a multipath signal is present, the composite signal will tend to pull the desired signal off of bore-site resulting in the squelching of the channel. If necessary, the pulses can be filtered out if needed for a specific application.

Figure 2:
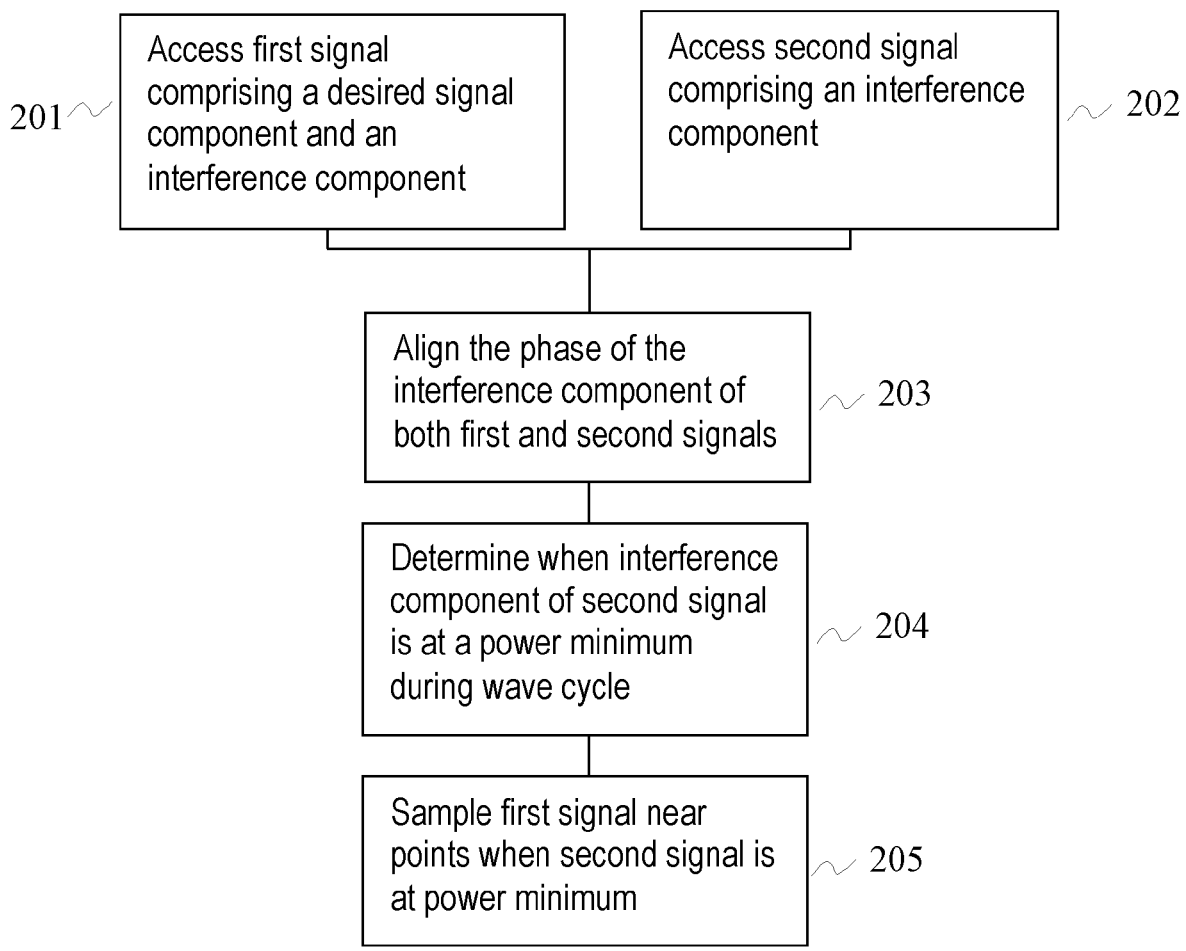
FIG. 2 illustrates a flowchart of a method for performing a selective-sampling operation.

As has been mentioned, the selective-sampling receiver 100 is configured to perform a selective-sampling operation using the selective-sampling circuitry 130 for the digital implementation. The selective sampling operation may also be performed by a digital algorithm. Referring to FIG. 2, a method 200 for a selective-sampling receiver to perform the selective-sampling operation is described. The method 200 will be discussed with reference to the selective-sampling receiver of FIG. 1. The selective-sampling receiver accesses a first signal comprising a desired signal component and an interference component (201) and accesses a second signal, either from an external source or an internal source, comprising an interference component (202). As can be seen in FIG. 2, the order that the selective-sampling receiver accesses the two signals is unimportant to the principles of the present invention, although in many embodiments the two signals will be accessed or received simultaneously.

Selective-sampling circuitry in the selective-sampling receiver, such as delay circuitry 131, aligns the phase of the interference component of both the first and second signals (203). The selective-sampling receiver takes advantage of the fact that the interference component of the first signal may lead or lag the interference component of the second signal by a phase of 90 degrees in some embodiments. By delaying either the first or the second signal by 90 degrees, the phase of the interference components in both the first or second signal should be aligned.

The selective-sampling circuitry then determines when the interference component in the second signal is at a power minimum during a wave cycle (204). As the first and second signals are usually periodic, they will have predictable power minimums or zero crossing points. For example, a sine wave has two power minimums or zero crossing points per wave cycle, which is referred to the Nyquist sampling rate. The selective-sampling circuitry, such as zero-crossing detector 132, detects when the second signal has the power minimums. Since the interference components of the first and second signals are aligned, the interference component of the first signal will be at a power minimum whenever the second signal is at a power minimum.

The selective-sampling circuitry samples the first signal as close as possible to the point in time that the second signal is at a power minimum (205). The sampling may be accomplished by the sample-hold circuitry 133 of FIG. 1A. As mentioned previously, the interference components of both the first and second signals will be at a power minimum at the same time when their phases are aligned. Consequently, only the desired signal component and perhaps a noise component of the first signal will remain to be sampled if the sampling occurs during the power minimum of the second signal. As a result, any signal that is reconstructed from the sampling will be very close to the desired signal. As long as the sampling is performed at least at the Nyquist sampling rate of the first signal, then a reasonable desired signal may be reconstructed. The reconstructed signal may then be provided by the selective-sampling receiver to other instruments, such as a signal processor in a radar system, for further use and analysis.

Advantageously, the selective-sampling method just described suppresses the unwanted interference signal component and recovers the desired signal component without the need for time consuming calculations to determine interference estimates and then to subtract them from the desired signal. In addition, since the selective-sampling receiver derives when to sample from the power minimums of the interference signal component in real time, it is able to respond to changes in the interference environment almost instantaneously.

Figure 3A:
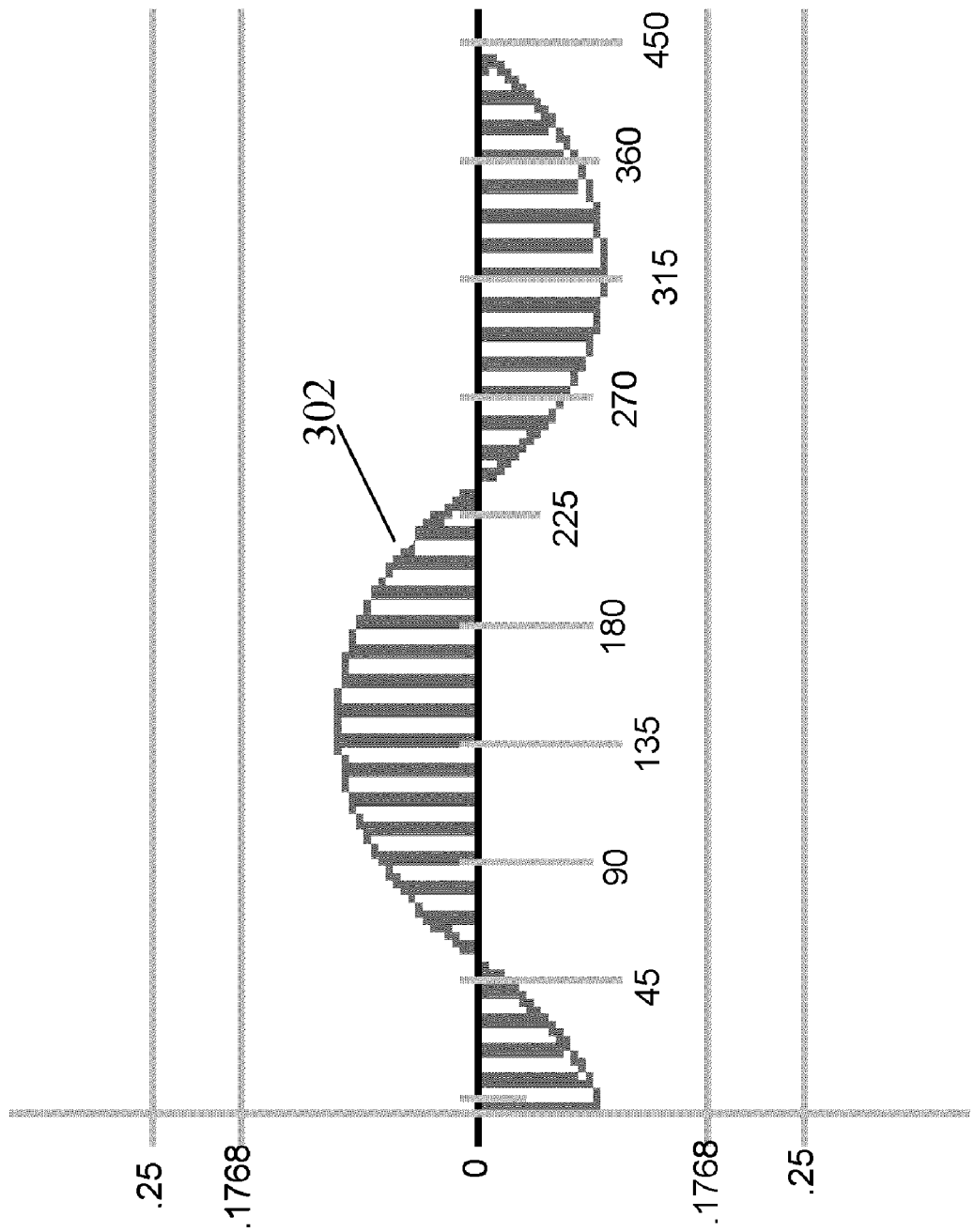
FIG. 3A illustrates a desired signal.

A specific example of the selective-sampling operation will now be described with reference to FIGS. 3A, 3B and 3C. In FIG. 3A, a 450 degree portion of a desired signal 302 at bore-sight is shown. A bore-sight signal is one that is directly in front of an antenna and has maximum power. The desired signal has a 360 degree cycle and has power maximums around 135 degrees and 315 degrees. The amplitude at these points is between 0 and 0.1768 in this example.

Figure 3B:
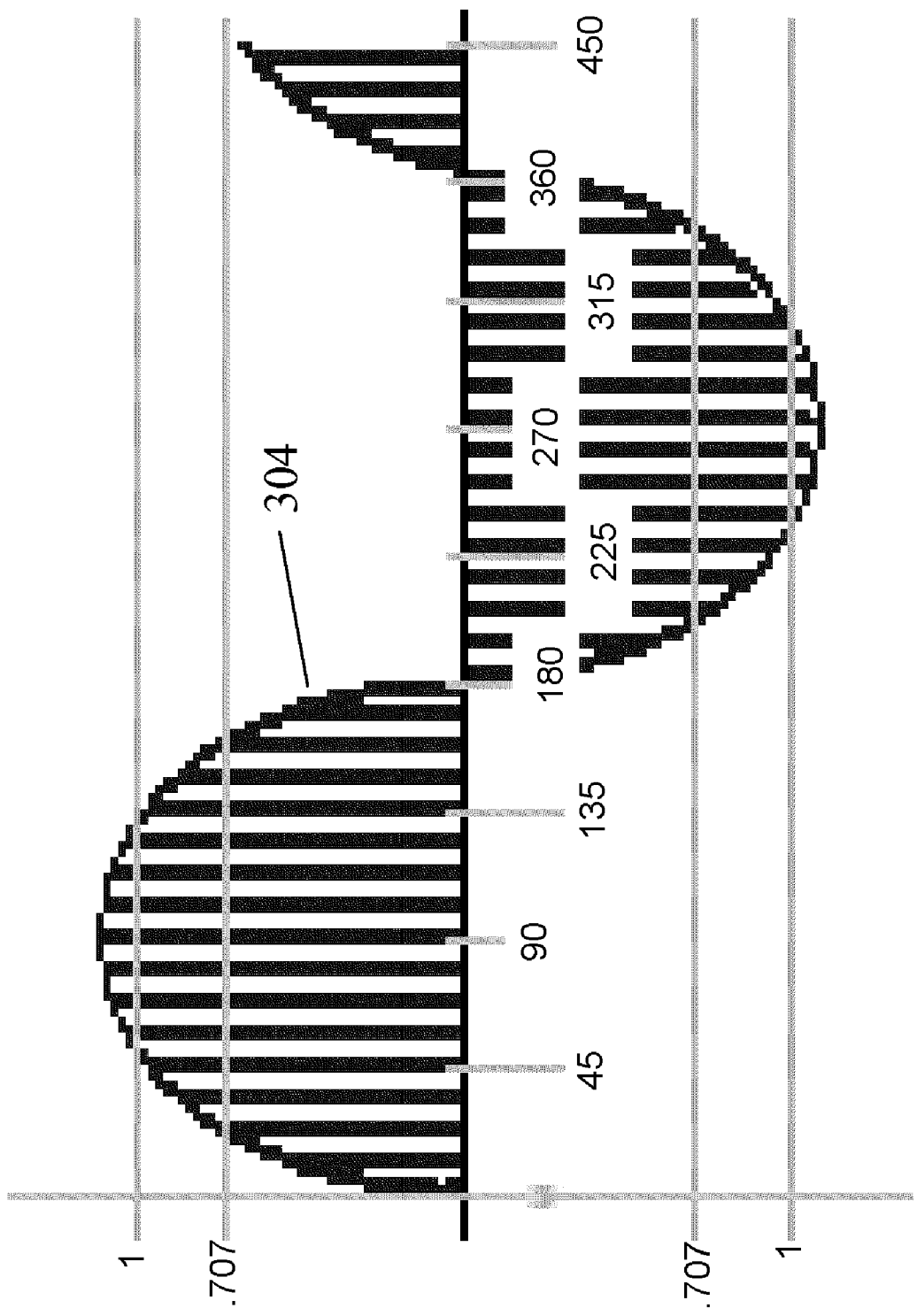
FIG. 3B illustrates an interference signal and its power minimums.

FIG. 3B depicts a 450 degree portion of an interference signal 304. The interference signal has power maximums around 90 and 270 degrees, which have amplitude of around 1 and, in this example, power minimums at 0 and 180 degrees. There is also a power minimum at 360 degrees, which is the start of a new wave cycle. Note that during the 450 degrees that are shown, the magnitude of the interference signal 304 is much greater than the magnitude of the desired bore-sight signal 302 and would thus dominate the desired signal 302.

Figure 3C:
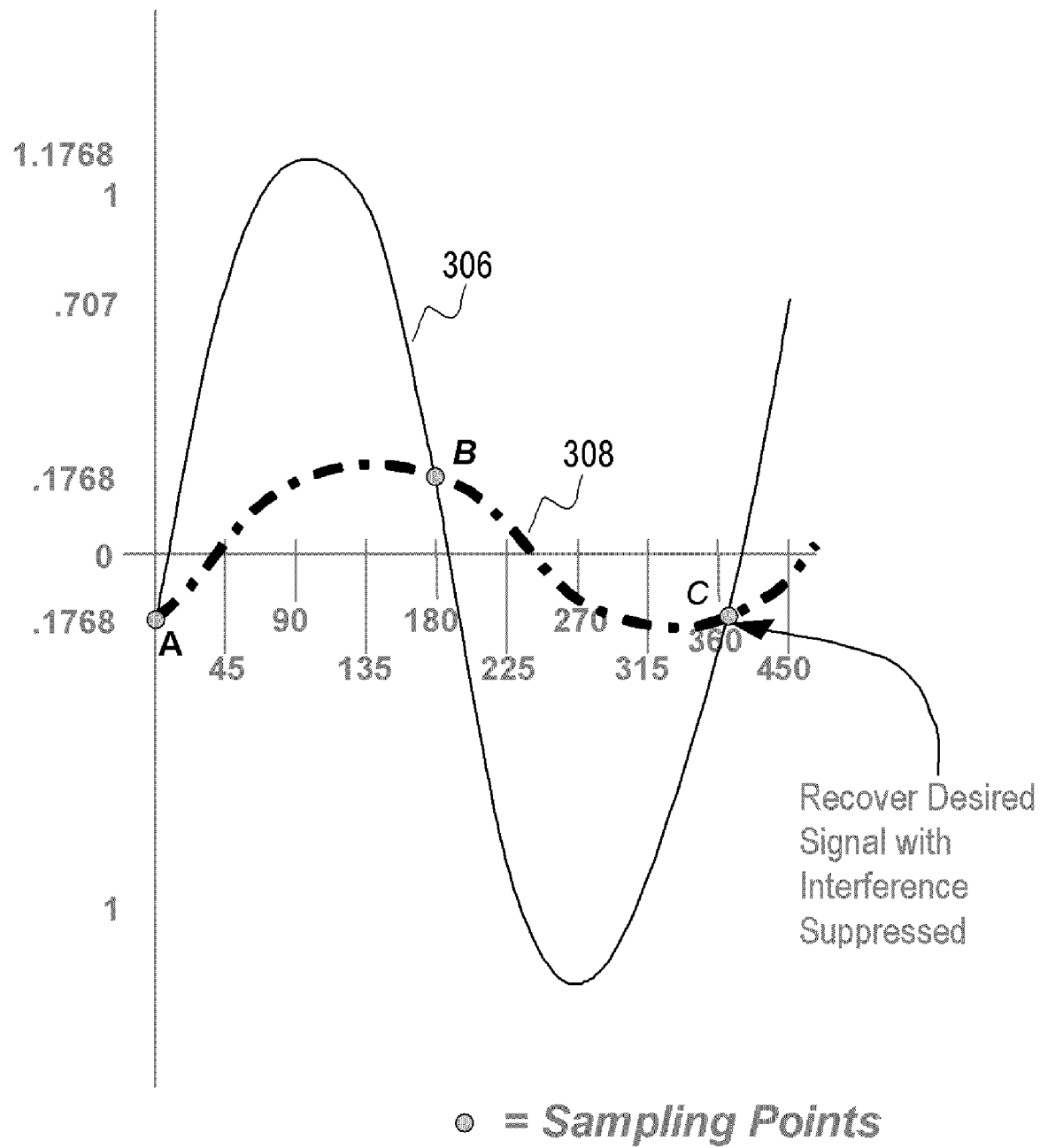
FIG. 3C illustrates a summation signal of the signals in FIGS. 3A and 3B.

FIG. 3C depicts a signal 306 that is a summation of the desired signal 302 and the interference signal 304. This may represent the first signal of FIG. 1A. As can be seen, the magnitude of the summation signal 306 is close to the magnitude of the interference component as the interference component dominates the signal. FIG. 3C also shows sampling points A, B, and C. Sampling point A corresponds to the power minimum of the interference component at 0 degrees, sampling point B corresponds to the power minimum at 180 degrees, and sampling point C corresponds to the power minimum at 360 degrees.

When the summation signal is sampled as close as possible to the summation points, the desired signal may be recovered. The recovered signal is depicted by the dashed line 308 in FIG. 3C. As can be seen, the recovered signal (dashed line 308) closely mirrors the original desired signal 302 of FIG. 3A.

Figure 4:
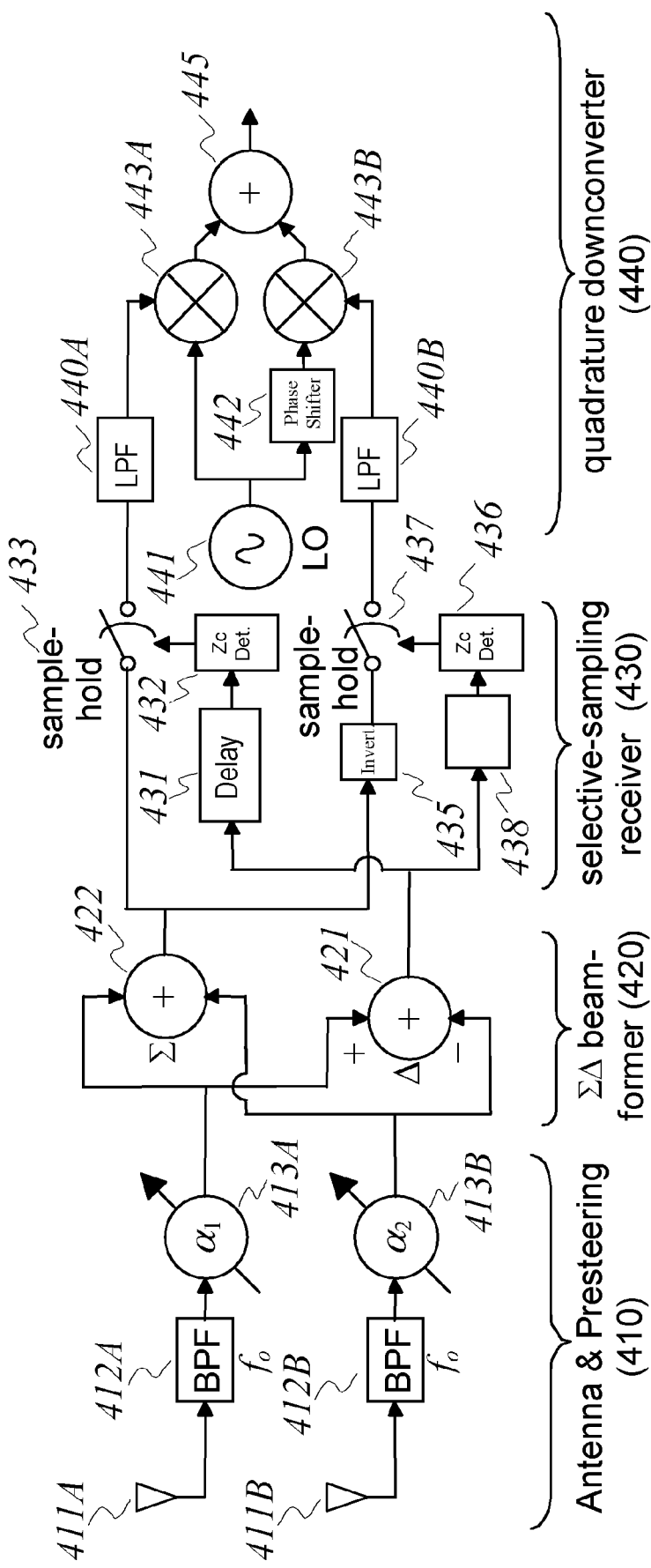
FIG. 4 schematically illustrates a receiver system in which a selective-sampling receiver in accordance with the principles of the present invention may be implemented.

Referring to FIG. 4, a two channel receiver system 400 in which a selective-sampling receiver in accordance with the present invention may be implemented is illustrated and will now be described. Receiver system 400 includes antenna and steering section 410, a ΣΔ beam-former 420, a selective-sampling receiver 430, and a quadrature down converter 440.

Antenna and steering section 410 includes two antenna elements 411A and 411B that are used to measure two signals. Antennas 411 may be any antenna known in the art, such as for example a monopulse antenna array. For example, antenna 411A may be used to measure a signal containing both the desired signal and the interference signal while antenna 411B is used to receive the same signal, but at a different phase angle. The measured signals are passed through band pass filters 412A and 412B, which are used to filter out unwanted signal bands and may be any filter known in the art. The filtered signals are then steered by steering networks 413A and 413B, which may be any known steering network in the art, to the inputs of ΣΔ beam-former 420. In the depicted example, steering network 413A is used to steer one of the measured signals to the bore-sight angle of arrival, while steering network 413B is used to steer the other measured signal to some off bore-sight angle of arrival.

The ΣΔ beam-former 420, which may be any ΣΔ beam-former known in the art, has a summation channel 422 and a difference channel 421. The summation channel 422 produces a first signal which is a composite sum of the desired signal component and the interference signal component. On the other hand, the difference channel 421 produces a second signal where one-half of the received signal is subtracted from the other half. However, when the second signal is at bore-site, the desired signal component is phased out, thus leaving only the difference component in the second signal.

The first and second signals are then provided to selective-sampling receiver 430, which may correspond to selective-sampling receiver 100 of FIG. 1A. However, FIG. 4 depicts an alternative embodiment of the selective-sampling receiver. In this embodiment, both an in-phase and quadrature component of the first signal will be sampled. To preserve all signal information in some instances, it may be necessary to selectively sample both the in-phase and quadrature components of the first signal. This helps to prevent loss of signal information and minimize distortion produced in the analog reconstruction process. The sampling circuitry components of selective-sampling receiver 430 will be the same or similar to those described above in relation to selective sampling receiver 100.

For the in-phase sampling, the second signal passes through delay circuitry 431, where it is delayed in order to align its phase with the interference component of the first signal in the manner previously described. The zero-crossing detector circuitry 432 then detects when the second signal is at a power minimum during a wave cycle. The sample-hold circuitry 433 then samples the first signal, producing a signal that suppresses the interference and recovers the desired signal.

For the quadrature sampling, the first signal is passed through an impedance inverter 435, which creates a quadrature component of the first signal. The second signal is passed through circuitry 438, which creates a quadrature component of the second signal and aligns the phases of the signals. The zero-crossing detector 436 detects when the quadrature second signal is at a power minimum during a wave cycle. The sample-hold circuitry 437 then samples the quadrature first signal, producing a signal that suppresses the interference and recovers the desired signal.

Both the in-phase and quadrature sampled signals are then passed to quadrature downconverter 440. Both signals pass through low-pass filters 440A and 440B in order to remove harmonic content introduced in the sampling operation. Some local oscillation 441 is mixed by mixers 443A and 443B with the in-phase and quadrature signals respectively, the local oscillation having been converted to quadrature by impendence inverter 441 before the mixing. Finally, the adder circuitry 445 combines the in-phase and quadrature signals to reconstruct the desired signal.

Figure 5:
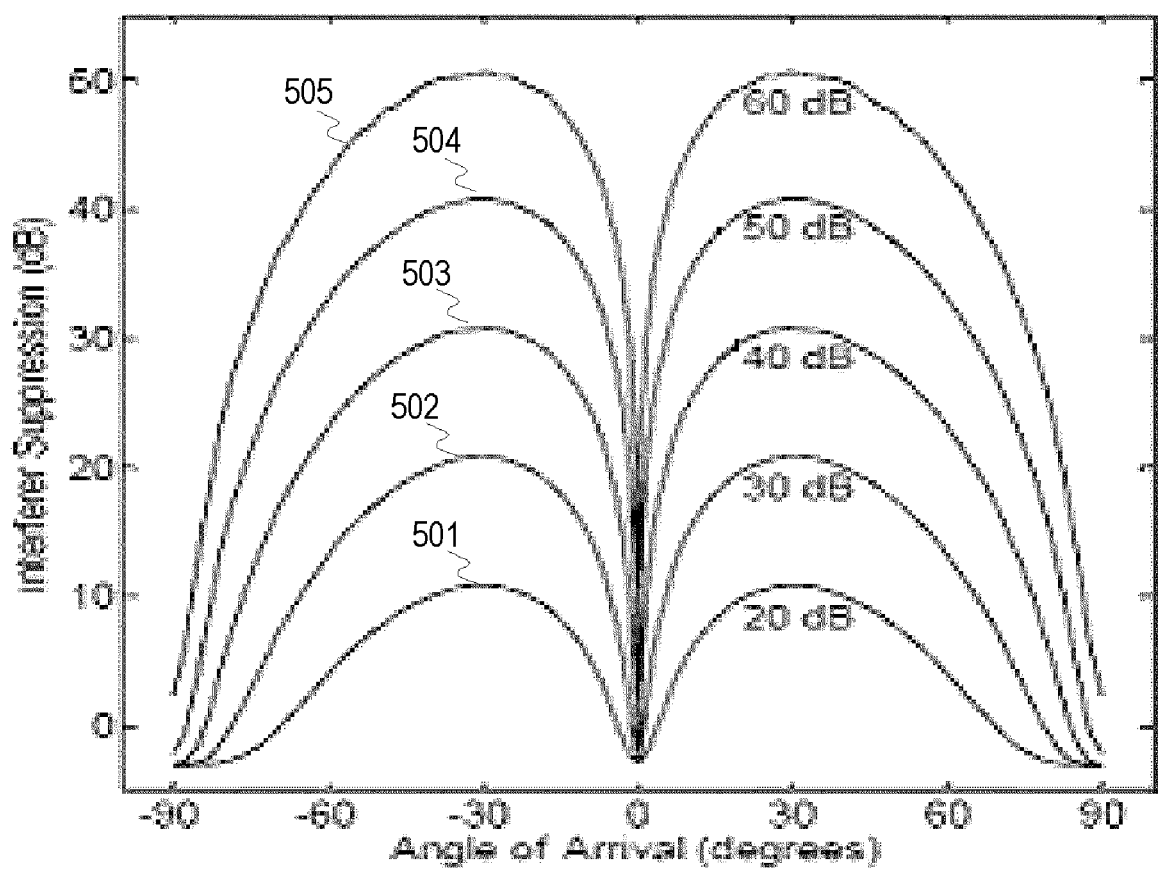
FIG. 5 illustrates interference suppression versus channel isolation for various angle of arrival.
Figure 6:
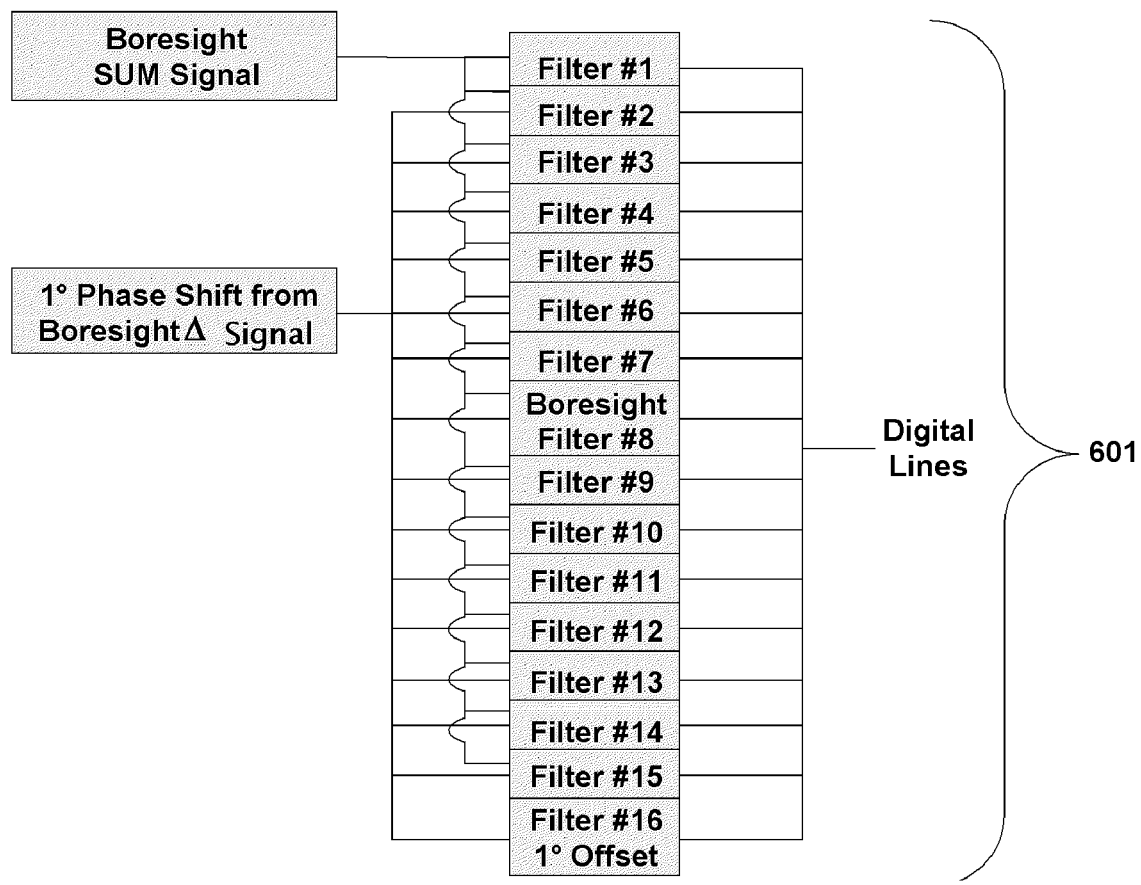
FIG. 6 schematically illustrates multiple selective-sampling receivers implemented in a bank configuration with each cell in the bank having a slightly different input relationship.

The two channel receiver system just described suppresses interference without the need for complex circuitry. Cross talk between the summation and difference channels in the ΣΔ beam-former, however, may limit the suppression of the interference. However, providing isolation for the two channels helps to overcome this problem. The isolation may be accomplished by any isolation technique known to one skilled in the art. FIG. 5 shows interference suppression versus the angle of arrival of the interference signal for various levels of isolation in the beam-former. For example, curve 501 illustrates interference suppression for 20 dB of isolation, curve 502 illustrates interference suppression for 30 dB of isolation, curve 503 illustrates interference suppression for 40 dB of isolation, curve 504 illustrates interference suppression for 50 dB of isolation, and curve 505 illustrates interference suppression for 60 dB of isolation. In some embodiments, the selective-sampling receiver 100 may be utilized in a bank of multiple selective-sampling receivers. This is done to increase the field of view that may be monitored by a system implementing the selective-sampling receivers as the measured azimuth and elevation angles are increased. This is illustrated in FIG. 6, which depicts a bank 601 of 16 selective-sampling receivers or filters. In this embodiment, the first signal comprising the interference and desired signal components is still measured at bore-sight as in the two channel case and is provided to all 16 selective-sampling receivers. The second signal consisting of the interference signal, however, is shifted for every selective-sampling receiver, 1 degree in the depicted example, such that the interference component is slightly different for each receiver. The sampling operation will still be performed as described previously, i.e. the first signal will be sampled when the interference component of the second signal is at a power minimum.

Figure 7:
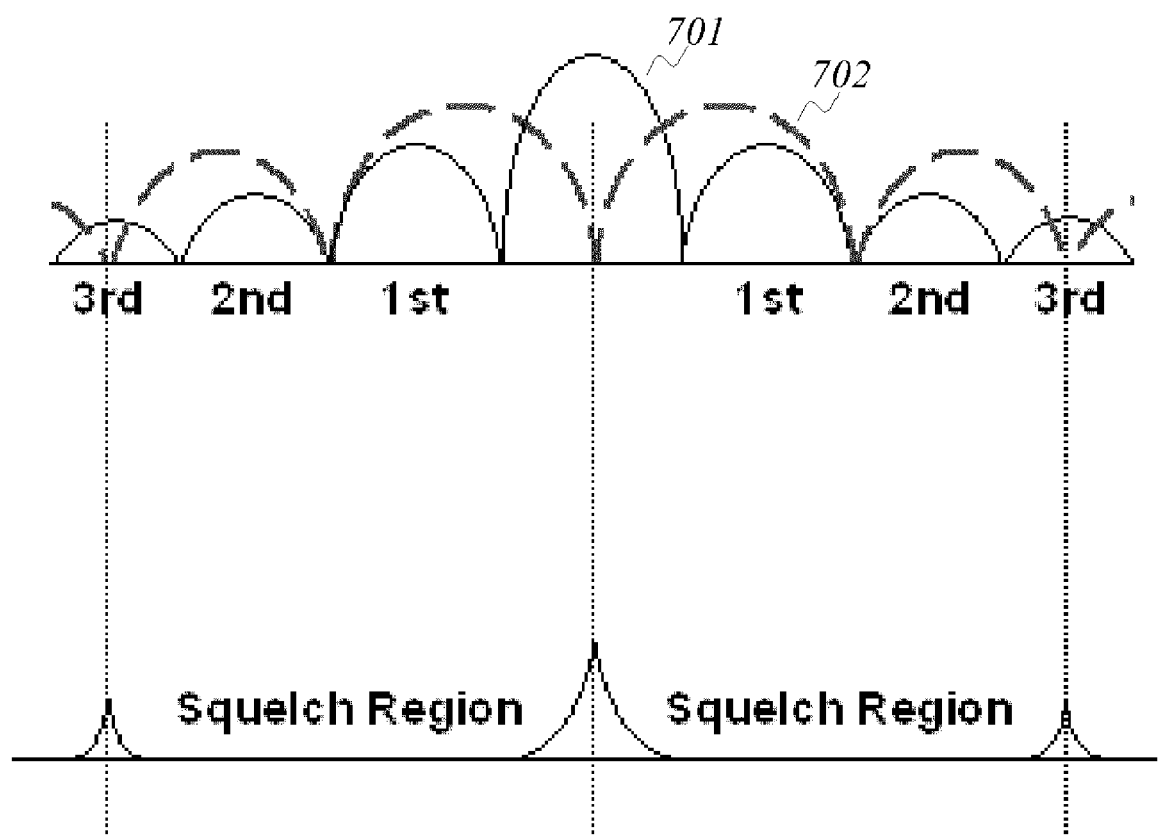
FIG. 7 illustrates squelch performance of a selective-sampling receiver.

The selective-sampling receiver also may be implemented in a system that uses a sub-array to measure an antenna beam. In this case, only the even side lobes will have a receiver in-lobe condition. As a result, a squelch region will be provided for the odd side lobe energy. In addition, a squelch region is produced and there is no output when the delta input is of a greater value than the attenuated sum input. This can be seen in FIG. 7. In FIG. 7, the main beam 701 shown with the squelched lobe 702. This embodiment may be useful in preventing interference from electronic counter measures that often time enter the main lobe from the side lobes.

The selective-sampling receiver and selective-sampling method described with relation to FIGS. 1A, 2, and 4 above are useful in counter-counter measure systems that are used to block electronic counter measures and tracking systems that are used to suppress decoy signals. In particular, the ability of the selective-sampling receiver to adjust almost instantaneously to a change in the interference environment can be helpful in a situation where a radar jamming signal is present in order to prevent a target from being seen. This ability is also helpful to discriminate between a target and a decoy, for example an airplane using radar, a ship using sonar or submarine pulling a decoy to deflect detection by radar or sonar.

The selective-sampling receiver and selective-sampling method described with relation to FIGS. 1A, 2, and 4 above may be utilized in many medical applications. For example, the selective sampling receiver may be used in ultrasound systems. An ultrasound transducer is a series of piezoelectric transducers placed in parallel with each other. As a sound pulse is sent out it travels at the speed of sound until it hits something such as soft tissue. It then reflects some of the energy, which is picked up by the ultrasound transducer. Each piezoelectric sensor picks up some of this received energy and a computer processing an image is formed. The selective sampling receiver helps to focus the received energy for better imaging.

Likewise MM systems pickup radio frequency energy in order to form its image. When water atoms are placed in a strong magnetic field the atoms align to the same orientation. When this water is pulsed with RF energy, the atoms shift alignment to respond to the RF pulse similar to a microwave oven. When the RF energy stops, the water realigns to the magnetic field and in the process releases RF energy as well. This energy is read and an image is formed. Different densities of water release different amounts of RF energy which look different on the final image. The selective sampling receiver is capable of focusing in on smaller areas of interest or increase the resolution in troughs areas. In addition, since more than one thing can be seen at the same time in the same field of view higher resolution images are possible.

The selective sampling receiver may also be used in hearing aids and other such devices. In a hearing aid or other repeater applications, the second signal may be produced by the system itself. This means that the information that is obtained from the second signal discussed previously (i.e., when to sample and the zero-crossing point of the second signal) can be predicted by the system. As a result, only a first signal containing both an interference and desired signal component is actually accessed or received by the hearing aid. However, since the zero-crossing point is predicted for the interference component, the desired component is sampled as previously discussed and the desired signal can be produced.

The selective-sampling receiver and selective-sampling method described with relation to FIGS. 1A, 2, and 4 above may also be utilized in communications networks. Because the selective sampling receiver has the ability to suppress unwanted signals, two satellites or communication towers may be in close proximity to each other and transmit using the same frequencies. Since each satellite or communication tower will have its own selective sampling receiver, the amount of data that may be transmitted is increased as each satellite or communication tower will suppress unwanted signals from the other satellite or tower.

Accordingly, the principles of the present invention relate to a selective-sampling receiver and method. The selective-sampling receiver utilizes low complexity, low cost components to achieve a high level of interference signal suppression. This removes the need for expensive hardware to be used in interference suppression. In addition, the need for complex possessing capabilities is also removed. Accordingly, the principles of the present invention are a significant advancement in the art.

In order to find the right time to sample a signal that is made up of more than one component (a desired signal and at least one interference signal) resulting in the separation of one of the components, antennas can be sued to pick up patterns that have nulls. The desired signal is placed in this null in the antenna or an antenna network pattern meaning that this antenna has no input from the desired signal. A second antenna or antenna network will have the desired signal in its antenna pattern along with the interferer.

One such system is a monopulse antenna array. Two antennas create this antenna network. Two channels are created; one is called the sum channel since antenna elements A and B are added up in it. The second channel is called the Delta channel since one half of the received signal is subtracted from the other half. For example input A is subtracted from input B. A-B and the radio frequency pickup patterns as compared to angle of approach of RF energy can be determined. A signal that is at bore-site (directly in front of the antenna array) has maximum input in the Sum channel. But since the inputs are matches in all antenna pickups, the delta channel has no pick up of the signal since antenna A completely subtracted from antenna B.

Now using the delta channel that has only the interferer signal, the point in time to sample the sum channel that has the interferer and the desired signal can be determined.

In one embodiment, a satellite dish Gain of the desired signal from competing satellites is 10-20 dB. In the selective sampling receiver this separation in amplitude isn't created with satellite dish gain but in interference suppression ending with an equal amount of amplitude difference in the final product. Two satellites can now exist in close proximity operating on the same frequency and not interfere with one another using embodiments of the invention. Advantageously, the data throughput may be doubled when dealing with properly designed system utilizing embodiments of invention described herein.

Embodiments of the invention can be used with any type of waveform (sine, square, triangle, pulse, etc.) and any transmission medium (air, water, electromagnetic, etc.) to detect energy levels of these waveforms. Sampling can be accomplished during the representative power levels taken from the waveform.

With repetitive sampling of a waveform, the waveform can be converted into a steady power level. This may include multipath signals although the exact power level may not be known. Fluctuating power levels may be due to background signals that are not synced to the detected or predicted waveform and resulting sampling points. Separation of these fluctuating levels can be done mathematically or with a filter such as a capacitor. When a waveform is held to a steady power level, weaker waveforms can be detected and received. Alternatively, known or sampled/detected sources of interference can be sampled such that they do not appear in the final sampled output.

By sampling as discussed herein, a signal can be produced that is suppressed. This allows for the same frequency to be used for both receiving and transmissions. This may be used, by way of example and not limitation, in repeaters and hearing aids. When sampling is accomplished, it is preferably done at twice the primary frequency or twice the intermediate frequency or twice the received frequency. this is above the Nyquist sampling rate. Further, embodiments of the invention can quickly respond to changes in the interfering signal since it is one half of the received wavelength.

Placing the signal of interest or the desired signal into an amplitude null on an antenna or an antenna array or other device or system which produces a receiving/pickup signal, the undesired signals can be minimized for a minimum or constant or known energy point at which sampling is accomplished. In one embodiment, the signal of interest and the undesired signal are offset in the pickup system such that the undesired signal is present and the desired signal is not.

After analyzing the undesired signal or signals for the proper timing, which is preferably located at the minimum energy points or any known or constant energy points. In some embodiments, a phase delay may be needed in order to accomplish sampling at the same point of time when referring to the phase of the undesired signals.

In one embodiment, to avoid the un-uniformed multiple signal addition of the undesired signal that occurs when producing an antenna's null as compared to an omni directional antenna's addition of the same signals coming from different angles of approach, a purely null or delta antenna system pickup system can be used. In such a system, the signal of interest is placed into the true null for interference analyzing. The signal of interest is then sampled out of the two null channels that are offset from the signal of interest in opposite directions or orientations when compared to the graphed null pickup patterns. The output of these two pickups is full wave rectified or changed to an absolute value and added. The provides for a suppressed, but present signal of interest and a uniformed pickup pattern for the signal of interest and the interfering signals that are analyzed in the true delta pickup pattern, except close to boresight or the center of the dual delta pickup patterns. This eliminates the ambiguities that form from using unlike system channels that have different pickup patterns.

Sinusoidal thermal noise signals can also be suppressed due to the same signals being used throughout with small delays added to provide for different angles of approach. As the channels are compared to each other they will be similar and the point of suppression for this noise can be found. As a result the system signal to noise should at least remain constant as it passes through the system.

One embodiment uses the angle of approach to isolate the signal of interest and such systems are inherently directional. When enough energy is received from phase analyses for the unwanted signal, the unwanted signal will be suppressed from off null angels of approach. This allows for added angle accuracy to be achieved.

An analog or digital algorithm that compares received levels from different channels such as a sum and difference channels of a mono-pulse receiver system where the signal of interest is placed in a null so that when this channel passes through its zero crossing the sum channel is sampled.

A bank of analog circuits/digital algorithms where the input to each cell in the bank is formed to represent a different angle of approach resulting in a wide field of view. Multiple returns are processed in a parallel process of evaluation allowing for faster evaluation of the received wave front.

Counter-counter measure systems may utilize large energy returns (jamming of interference) or numerous radio echoes (balloon or decoys). Because one embodiment of the invention uses an operational amplifier, a diode and a few resisters, it is less likely to be affected by high energy particles as found in space that will damage large integrated circuits such as signal processors. This analog suppression of the unwanted signals and reception of wanted signals can be performed fast.

Tuning of such an analog system in regards to sensitivity to angle of approach is accomplished by attenuation of the channel in which the desired and undesired signals are placed. Now when the amplitudes are compared in the two channels the desired signal should be larger in order to come out of the comparator. Signal to noise degradation can be overcome if sampling is done from the un-attenuated channel before it is attenuated.

A receiver can take advantage more than one transmitter in the antennas field of view but use the tuning to separate out the different transmitters. This can allow for more than one satellite to be in a satellite receivers/dishes field of view and yet have the receiver choose which transmitted signal to pass on for processing.

When one embodiment of the system is tuned, the signal output may be either a sinusoidal signal if the signal of interest is in it or noise if the signal of interest is not in it or is two small to overcome the noise floor.

In one embodiment, it is possible to squelch out unwanted signals by manipulating the pickup patterns so that the desired angle of approach is passed but unwanted or undesired angles of approach are squelched. This is accomplished by overlapping the pickup patterns such as arrays of different sizes such as a full size into the sum input and half the size into the delta input in a mono-pulse system. As a result the odd sidelobe are squelched.

In pulse systems or spread spectrum systems this approach can be used and the need for very accurate timing systems eliminated. This is done by utilizing the angle of approach. The first signal will pass from the angle of interest but multipaths come from different angles of approach that will pull the received signal out of the angle bin being used. As a result the first leading pulse will be passed and other paths can squelch the channel.

The Handling of Multiple Interferes

When just one jamming/interfering source is presented in a Selective Sampling Receiver's Delta Channel the receiver operates in the amplitude domain. Embodiments of the invention can also operate when the sum and delta system has two jamming/interfering sources. In this case, it is possible for the two or more sources to have different amplitudes in the sum and delta channels. The zero crossing of the combined sine wave can be dependent on amplitude and phase/frequency of the two interfering signals. In this case, embodiments of the invention can change to the frequency domain by demodulating frequency modulated signals from the respective Sum and Delta channels. This eliminates any problems associated with amplitude summing of the multiple jamming or interfering sources.

I one embodiment, the invention may start by limiting the amplitude entering into the frequency domain. This reduces the affect of atmospheric noise that appears as pops or hisses in AM Amplitude Modulated systems.

One advantage of frequency modulation is that it is free from the effects of atmospheric noise or "static" that affects only the amplitude of the wave, since all the information is in the frequency variations. If the modulation is removed and the amplitude of the signal is varied, the ratio detector is advantageously not sensitive to the level. Some FM demodulators respond to the amplitude as well as the frequency, so the signal may be limited before detection. However, this is not necessary for a ratio detector.

Figure 8:
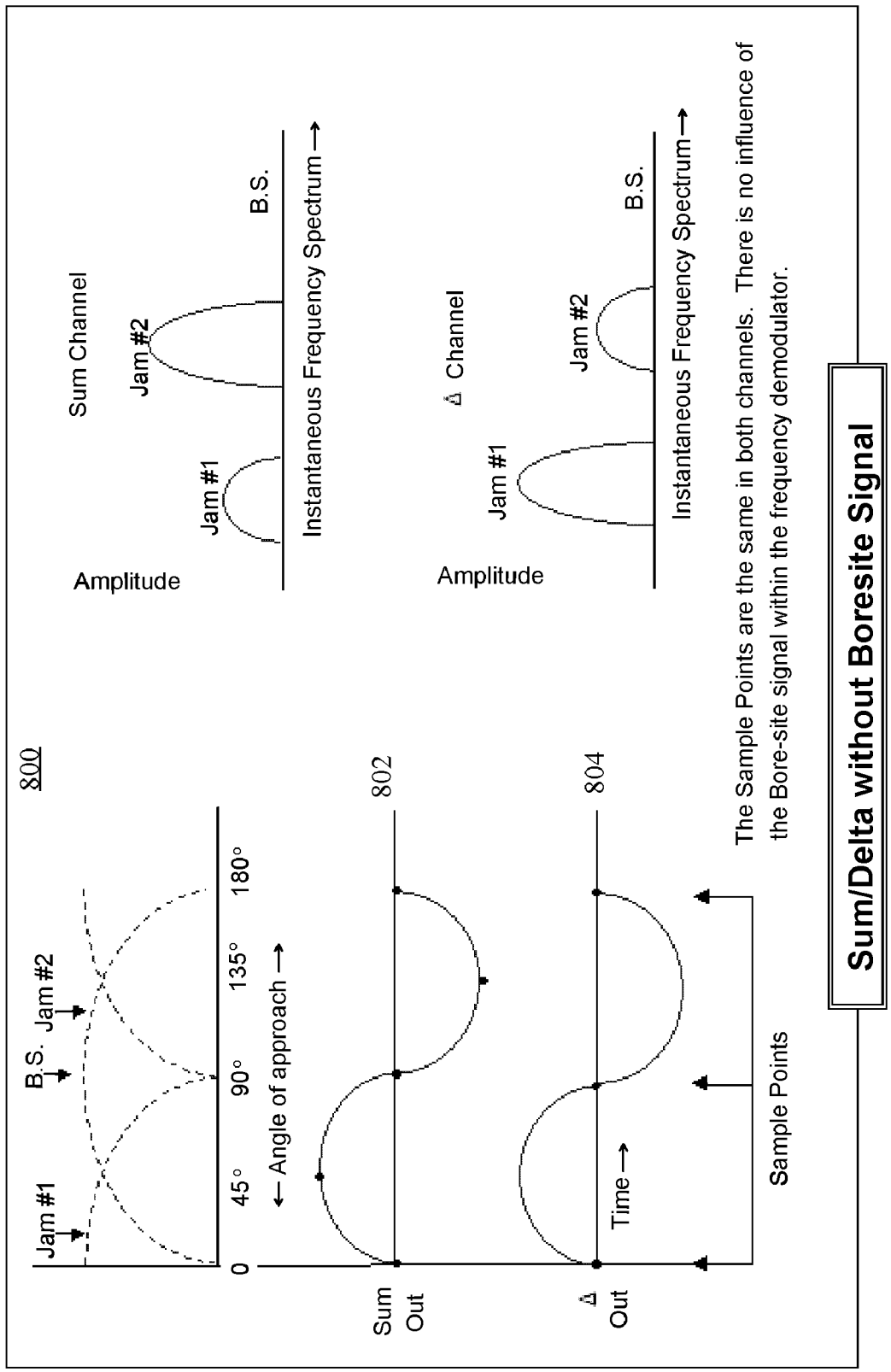
FIG. 8 illustrates a sum/delta without boresite signal.

FIG. 8 illustrates one embodiment of an approximate amplitude and frequency summation 800 that would found in the different channels. Note that the amplitudes changed but the frequency did not. This illustrates that when two interfering signal sources and no boresite signal is present in the sum channel 802 and delta channel 804, the frequency demodulated signals will be the same. As a result both interfering signals will be suppressed by using the time domain suppression techniques described herein.

Figure 9:
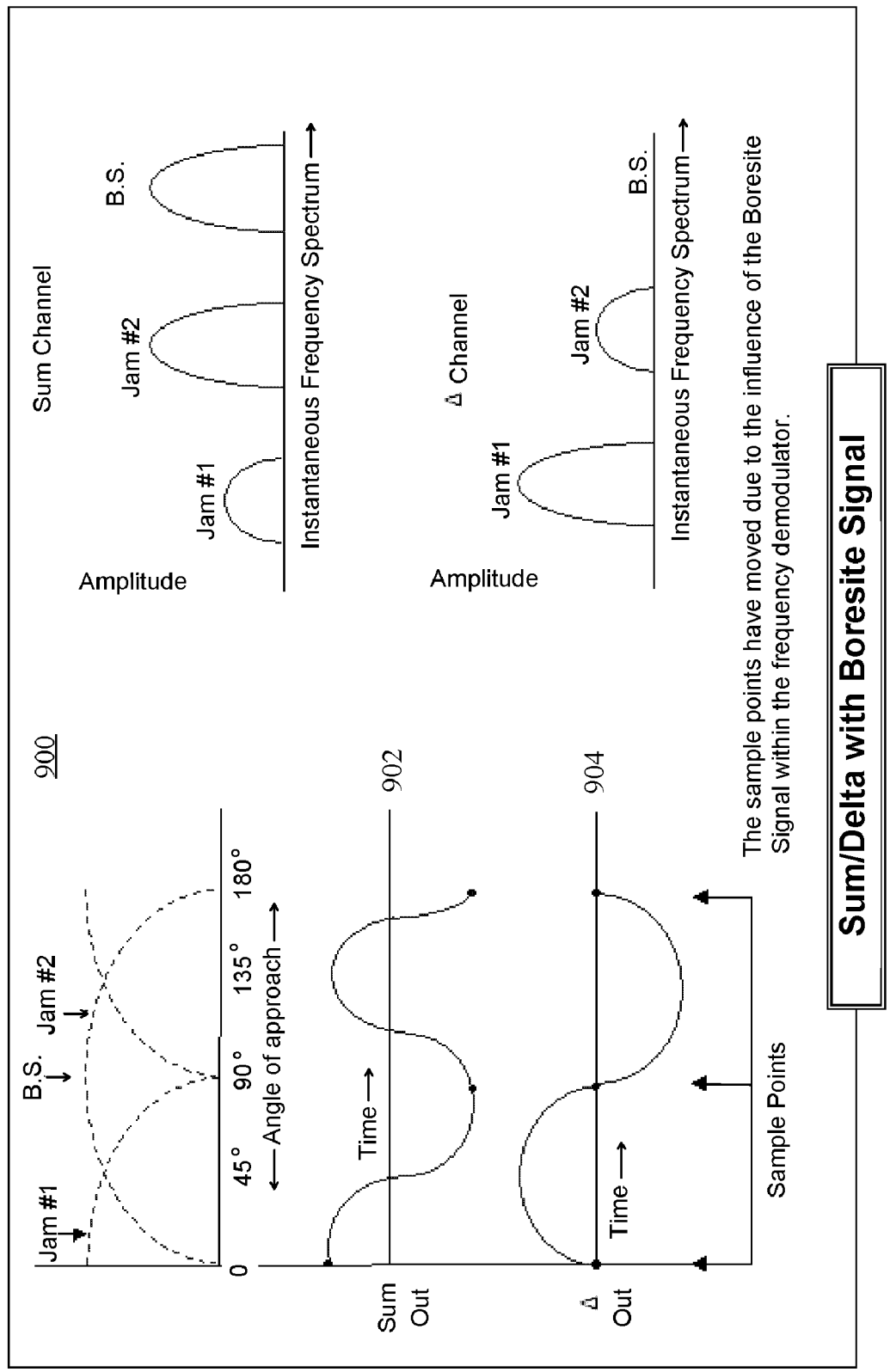
FIG. 9 illustrates a sum/delta with boresite signal.

Now when a signal is added at boresite, this signal contributes to the demodulated FM spectrum of the Sum channel 902 but not to the Delta channel 904 as seen in FIG. 9 at 900.

The demodulated Sum channel 902 is offset directly by the FM properties of the boresite signal source. As a result, a boresite signal can be seen in the presence of multiple off-boresite signal sources.

As a result, it may be useful to include not only Frequency and Amplitude Modulation techniques but Phase, Pulse, or any modulation scheme any domain or practice that is used to convey or measure information. This may include at any RF radio frequency, IF intermediate frequency, base band, or data stream of any kind whether created by WTI intentionally, as the case of broadband jamming or unintentionally as is the case of unintended interference.

It may also include recovered interference of any kind through any type of system that creates a system in which the desired information is in one channel with the interference, and only the interference in the other channel.

An imaging system using a multi-element array that creates one or more pencil receiver beams that can be used to scan for RF sources or reflections of RF signals is within the scope of the invention. Such a system can be used for navigation during bad weather or in complete darkness. When used in aviation, a runway can be lined with low power transmitters that such a system can see the runway. In addition, the runway can be illuminated with an RF beam of energy so that you can see reflection of objects that may be on the runway.

Furthermore, forward looking radar systems can be made or transmitters can be collocated with beacon lights. If a geological survey was done at each such beacon/transmitter the surrounding landscape can be simulated out of a database and presented to the pilot. And time stamp and ID from each transmitter may be needed.

In one example, such as with IED (Improvised Explosive Device), it is necessary to generate an interfering signal. IED's are often detonated when a signal (such as from a cellular device) is received by the IED. The interfering signal (such as a broadband signal) is being generated as increasing strength in order to compensate for improvements to the IEDs. One drawback to this approach is that the generated interfering signal now interferes with other communications.

Embodiments of the invention can overcome this problem by simply using information about the interfering signal, which is shown in this specific example. This information can be communicated in any way, optically for example. Timing differences can also be accounted for. In this case, knowing the interfering signal allows the desired signal (such as communications among the various entities) to be recovered. In fact, because the interfering signal is known, efficiencies in recovery can be achieved.

More particularly, in the IED environment the jammer signal (or interfering signal) is not necessarily picked up but rather communicated to the receiver because it is known, which would provide even greater channel isolation, and greater performance. This communication can be a signal pickup such as through an antenna, data link in any form, or a synchronizing/timing pulse that synchronize the two systems. Any type of system that will communicate enough information to find the phase of the unwanted signal is within the scope of the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A receiver system for selectively sampling a signal with two or more signal components, the receiver comprising:
   a first receive input for accessing a first signal, the first signal comprising a first desired signal component and an interference signal component; and
   sampling circuitry coupled to the first input, wherein the sampling circuitry recovers the first desired signal component from the first signal component by identifying when the interference signal component is at a power minimum using at least frequency demodulation.

2. The receiver system of claim 1, further comprising:
   a second input for accessing a second signal, the second signal comprising one or more interference signal components;
   wherein the sampling circuitry recovers the desired signal by:
      demodulating the first and second signals when performing selective sampling after the demodulation;
      aligning the phase of the one or more interference components of the demodulated first and second signals according to a type of the demodulation;
      detecting when the one or more interference components are at a power minimum; and
      sampling the first signal approximately when the one or more interference components are at a combined power minimum.

3. The receiver system of claim 1, wherein the demodulation is one or more of frequency demodulation, phase demodulation, pulse demodulation, or amplitude demodulation.

4. The receiver system of claim 2, wherein thermal noise is rejected after the demodulation of the first and second signals when performing selective sampling after the demodulation, wherein the demodulation is one of frequency or phase demodulation.

5. The receiver system of claim 1, further comprising:
   a second input for accessing a second signal, the second signal including one or more interference signal components; and
   wherein the second signal is received from a known source or an unknown source or both.

6. The receiver system of claim 1, wherein the first signal is a periodic waveform and includes zero crossing.

7. The receiver system of claim 1, further comprising:
   a second input for accessing a second signal, wherein the first signal and the second signal are from the same source.

8. A method for selectively sampling a signal with two or more signal components, the method comprising:
   accessing a first signal, the first signal comprising a desired signal component and one or more interference signal components; and
   recovering the desired signal component by identifying when the one or more interference signal components are at a power minimum using a selective sampling receiver on the demodulated signals.

9. The method of claim 8, wherein recovering the desired signal comprises:
   accessing a second signal, the second signal including the one or more interference signal components;
   demodulating the first and second signals;
   aligning the phase of the one or more interference components of the demodulated first and second signals if needed;
   detecting when the one or more interference components are at a power minimum; and
   sampling the first signal approximately when the one or more interference components are at a power minimum.

10. The method of claim 8, wherein the demodulation is frequency demodulation, phase demodulation, amplitude demodulation, or pulse demodulation.

11. The method of claim 8, recovering the desired signal comprises:
   generating one or more jamming signals with at least one jammer, wherein the one or more interference signal components is comprised of at least of one of the one or more jamming signals; and
   accessing a second signal, the second signal including the one or more jamming signals, wherein jamming signal components are at a power minimum before or after demodulation or when the second signal is a timing signal provided by the at least one jammer.

12. The method of claim 11, wherein the jamming signals are generated with a signal strength sufficient to interfere with a detonation signal transmitted to an explosive device.

13. The method of claim 8, further comprising:
   accessing a second signal, the second signal consisting essentially of the one or more interference signal components, wherein the first signal and the second signal are from the same source.

14. A receiver system for selectively sampling a signal with two or more signal components, the receiver comprising:
   a first input for accessing a first signal, the first signal comprising a desired signal component and one or more interference signal components; and
   sampling circuitry coupled to the first input, wherein the sampling circuitry recovers the desired signal from the first signal by identifying when the one or more interference signals are at a power minimum.

15. The receiver system of claim 14, wherein identifying when the one or more interference signals are at a power minimum comprises transforming the desired signal component and the one or more interference signal components out of a time domain and into a domain based on a characteristic of the signals.

16. An imaging system for navigating an aircraft on a terrain, the imaging system, comprising:
   a multi-element array configured to generate a pencil-receiver beams that can be steered;
   a low-power transmitter located on the terrain;
   a controller configured to direct the pencil-receiver beam towards the low-power transmitter; and
   wherein the controller is configured to determine the location of the aircraft based on the location of the low power transmitter detected by the pencil-receiver beam.

17. The imaging system of claim 16, further comprising:
   an RF-beam generator configured to direct RF energy towards the terrain; and
   a receiver configured to collect RF energy originating from the RF-beam generator and reflected from objects on the terrain.

18. The imaging system of claim 16, wherein the low-power transmitters are collocated with beacon lights or runway lighting.

19. The imaging system of claim 16, further comprising:
   a database containing geological survey information associated with the low-power transmitter; and
   wherein the controller is configured to display a simulation of the terrain surrounding a low-power transmitter.

20. An array of selective sampling receivers that includes a plurality of imaging systems as recited in claim 16, each imaging system configured to to provide a pencil received beam each representing a different angle of approach and forming a different pixel of an image of the received RF energy.

* * * * *